US006421948B1

(12) United States Patent
Craig

(10) Patent No.: US 6,421,948 B1
(45) Date of Patent: Jul. 23, 2002

(54) FISHING ROD HOLDER WITH SIGNALING DEVICE

(76) Inventor: Jeffrey L. Craig, 8545 South Straits Hwy., Wolverine, MI (US) 49799

( * ) Notice: Subject to any disclaimer, the term of this patent is extended or adjusted under 35 U.S.C. 154(b) by 0 days.

(21) Appl. No.: 09/652,484

(22) Filed: Aug. 31, 2000

Related U.S. Application Data
(60) Provisional application No. 60/187,329, filed on Mar. 6, 2000.

(51) Int. Cl.$^7$ ............................................... A01K 97/12
(52) U.S. Cl. ..................... 43/17; 43/21.2; 248/231.51; 248/515; 248/535; 248/538
(58) Field of Search .......................... 43/17, 16, 21.2; 248/514, 515, 518, 520, 523, 530, 534, 535, 538, 540, 231.51

(56) References Cited

U.S. PATENT DOCUMENTS

| | | | | |
|---|---|---|---|---|
| 1,131,508 A | * | 3/1915 | Hall | 43/17 |
| 1,516,484 A | * | 11/1924 | Meszaros | 43/17 |
| 2,032,537 A | * | 3/1936 | Kozikowski | 43/16 |
| 2,541,307 A | * | 2/1951 | Teel | 43/17 |
| 2,693,660 A | * | 11/1954 | Nebergall et al. | 43/21.2 |
| 2,924,038 A | * | 2/1960 | Dahlgren | 43/16 |
| 2,988,311 A | * | 6/1961 | Bow | 43/514 |
| 3,199,241 A | * | 8/1965 | Mauritz | 43/17 |
| 3,221,705 A | * | 12/1965 | Saviskas | 43/17 |
| 3,371,443 A | * | 3/1968 | Dobson | 43/17 |
| 3,401,479 A | * | 9/1968 | Keyes | 43/16 |
| 3,646,698 A | * | 3/1972 | Zacahe | 43/17 |
| 4,146,988 A | * | 4/1979 | Bednarczyk | 43/17 |
| 4,573,281 A | * | 3/1986 | Moisan | 43/17 |
| 5,050,333 A | * | 9/1991 | Debreczeni | 43/17 |
| 5,152,093 A | * | 10/1992 | Bartys | 43/17 |
| 5,269,088 A | | 12/1993 | Slaback, Jr. et al. | 43/17 |
| 5,313,734 A | * | 5/1994 | Roberts | 43/21.2 |
| 5,873,191 A | * | 2/1999 | Bova et al. | 43/15 |
| 6,050,019 A | * | 4/2000 | Anderson | 43/15 |
| 6,170,189 B1 | * | 1/2001 | Klein | 43/17 |

FOREIGN PATENT DOCUMENTS

| | | | | |
|---|---|---|---|---|
| DE | 19501342 B1 | * | 8/1996 | |
| GB | 835140 B1 | * | 5/1960 | 43/17 |

* cited by examiner

*Primary Examiner*—Darren W. Ark
(74) *Attorney, Agent, or Firm*—Van Dyke, Gardner, Linn & Burkhart, LLP

(57) ABSTRACT

A rod holder and signaling device for holding a fishing pole and signaling when a fish strikes a bait or lure is compact and is adaptable to secure the fishing rod to various structures. The fishing rod may then be temporarily abandoned or remotely monitored by the angler. The rod holder includes a clamping device, which is adapted to clamp over a variety of support structures to securely mount the fishing pole at a targeted fishing location. Preferably, the rod holder is pivotable relative to the clamping device to adjust an angle of the rod with respect to the clamping device and the support structure. The signaling device includes a flexible member, a signaling member, and a release mechanism rotatably mounted on the flexible member. The release mechanism is rotatable about the flexible member in response to tension being detected in the fishing line and rotates to disengage the release mechanism and thus the flexible member from a connector along the rod holder. The signaling device provides a visible and/or an audible signal to the angler when the signaling device is triggered. Preferably, the release mechanism is adapted to trigger the signaling device in response to a variable amount of tension in the line.

22 Claims, 5 Drawing Sheets

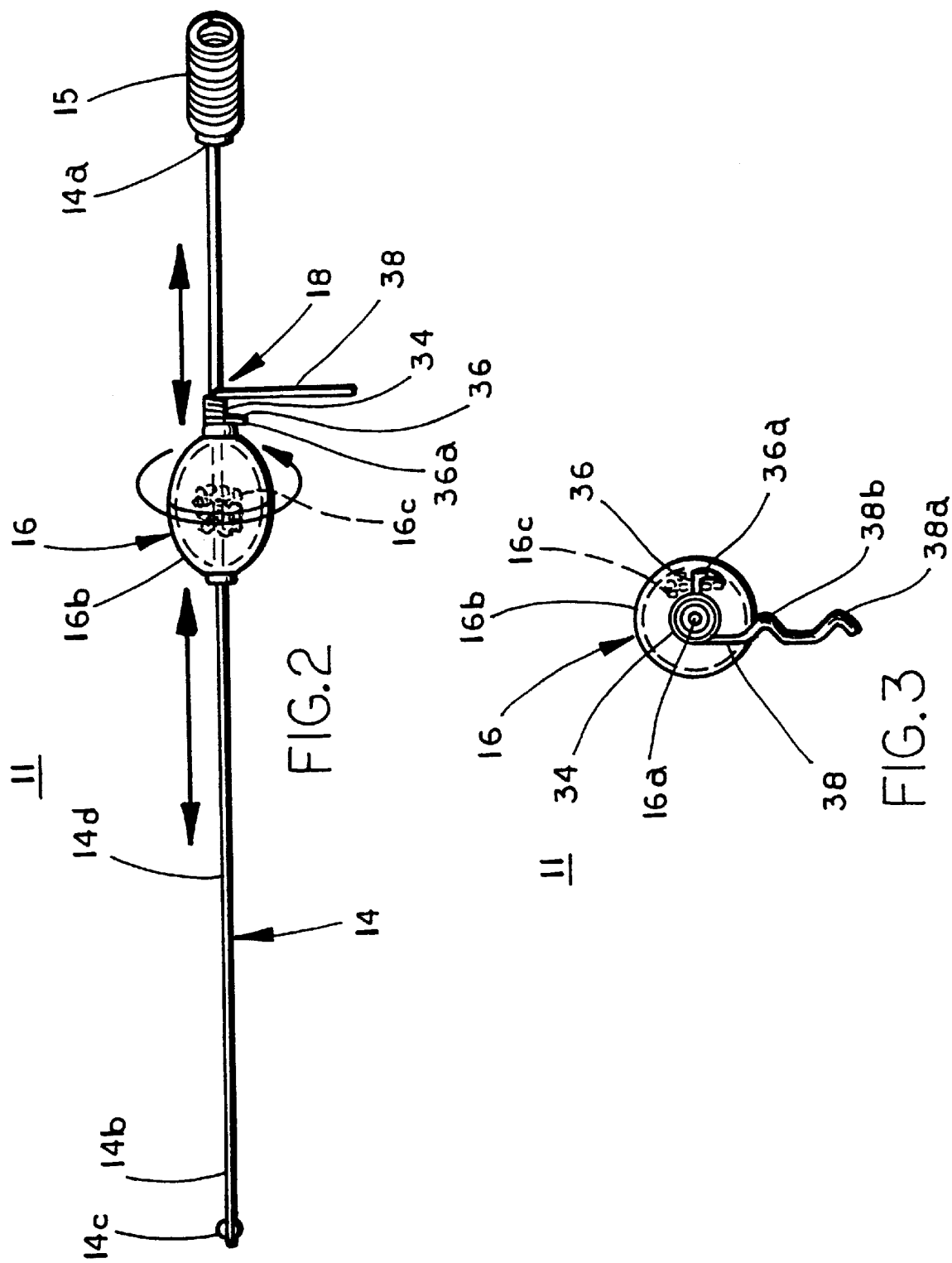

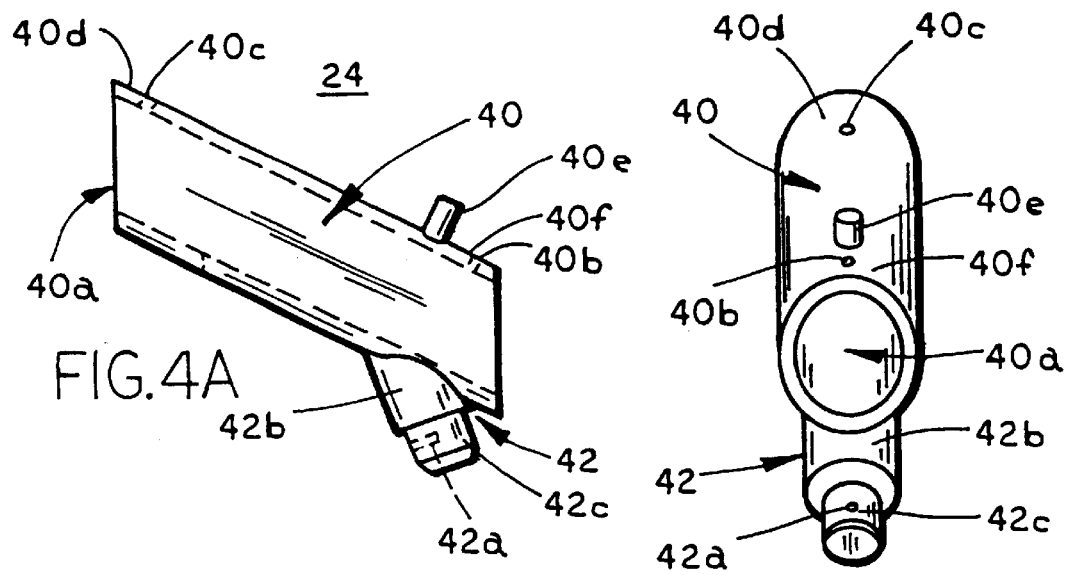
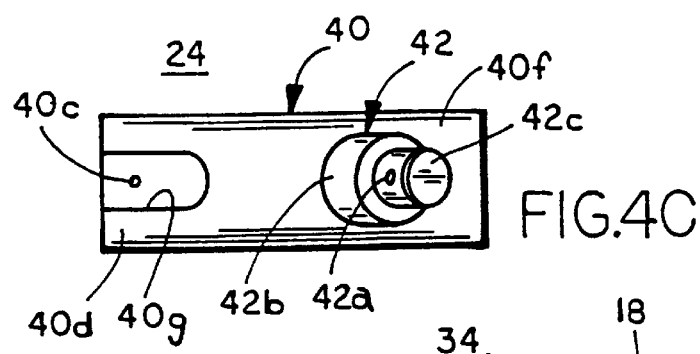
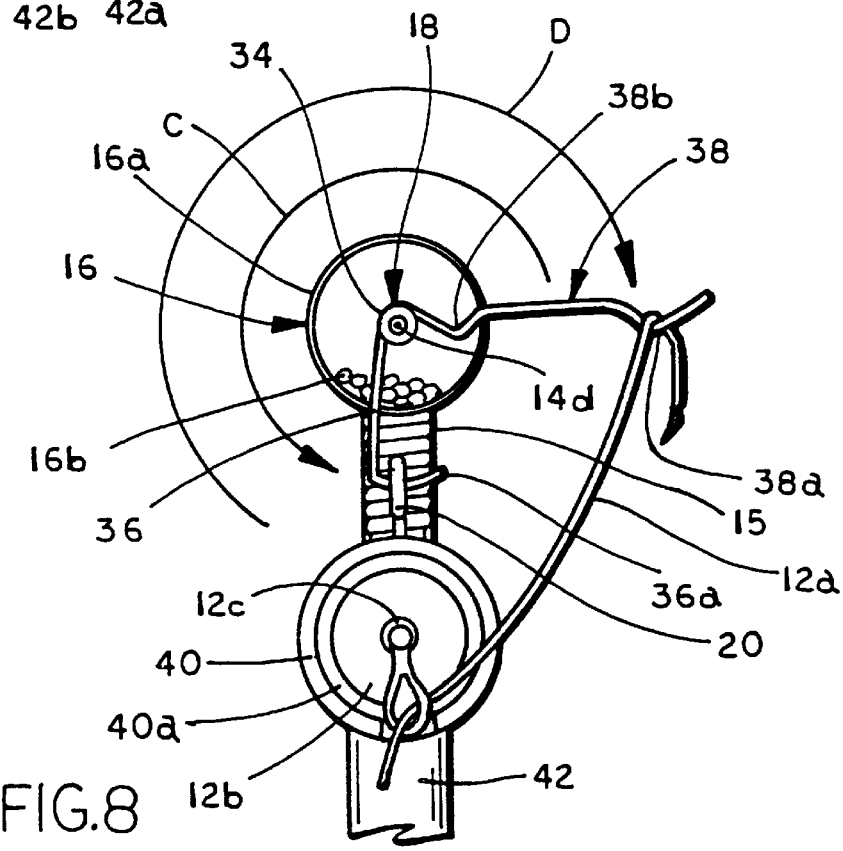

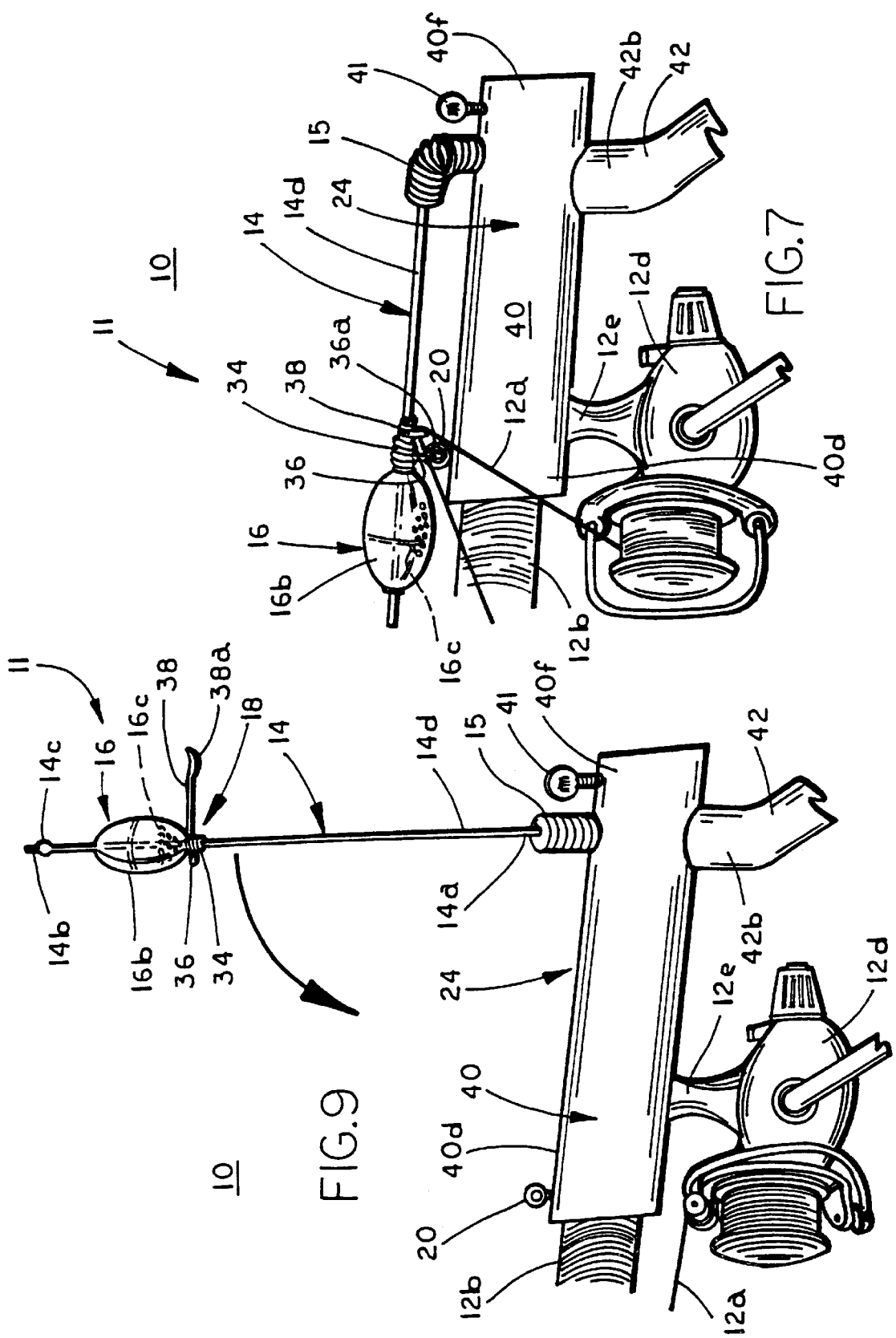

FISHING ROD HOLDER WITH SIGNALING DEVICE

This application claims benefit of U.S. Provisional Pat. Application, Ser. No. 60/187,329, filed Mar. 6, 2000, which is hereby incorporated in its entirety herein by reference.

BACKGROUND OF THE INVENTION

The present invention relates generally to signaling mechanisms for a fishing rod and reel for signaling when a fish strikes and, more particularly, to a fishing rod holder and signaling device.

Signaling devices for fishing poles, which function to signal when a fish strikes a lure or bait, are well known. Many of these devices are used for ice fishing and support an ice fishing rod at an ice fishing hole and release a flag or a visible signal in response to movement of the pole. However, these devices are typically designed solely for ice fishing poles, which is positioned in a generally horizontal orientation such that the end of the rod extends over a hole in the ice. Accordingly, such devices are typically not practical for use on conventional, spinning or casting rods and reels and/or for use in other fishing applications besides ice fishing.

One proposed signaling device is disclosed in U.S. Pat. No. 5,269,088, issued to Slaback, Jr. et al. The fishing pole holding and signaling device holds a conventional fishing pole in a generally horizontal orientation for use in ice fishing. However, the holding device requires a generally flat or stable surface for the device to be positioned at. Additionally, the framed device may be cumbersome to transport from one location to the next. Also, the device is not applicable to other fishing applications where it may be desirable to secure the rod in a more vertical orientation.

Therefore, there is a need in the art for a pole holder with a signaling device which may be easily portable and adapted for implementation at various structures or locations. The signaling device includes a triggering mechanism for triggering or releasing a signaling element to signal to the angler when a fish strikes or pulls at the fishing line.

SUMMARY OF THE INVENTION

The present invention is intended to provide a signaling device, wherein a triggering mechanism releases a signaling element in response to tension in the fishing line of a fishing pole. The signaling device is mounted to a pole holding apparatus which receives the handle of the fishing pole therewithin for securing the pole in an operative position for fishing. The pole holder and signaling device are substantially compact and easily portable from one location to another and may be easily mounted or secured to various structures via a clamping mechanism.

According to an aspect of the present invention, a signaling device for a fishing pole comprises a flexible member, a signaling member and a release mechanism with a connector adpated to be positioned along the fishing pole. The fishing pole includes a rod and fishing line. The flexible member has a first and second end with the first end being mounted to the rod. The signaling member is movably mounted on the flexible member. The release mechanism is rotatably mounted on the flexible member and is adapted to engage the connector on the rod to retain the flexible member in a set position. The release mechanism is adapted to receive the fishing line, whereby the release mechanism is rotatable relative to the flexible member to release from the connector in response to tension in the fishing line. The flexible member is movable to a signaling position when the release mechanism releases from the connector. The signaling member is movable toward the second end of the flexible member as the flexible member moves to the signaling position. Preferably, the signaling member is frictionally retained at the second end of the flexible member when the flexible member is in the signaling position.

In one form, the signaling member provides a visible signal to the user of the mechanism when the flexible member is in the signaling position. In another form, the signaling member provides an audible signal when the flexible member moves to the signaling position.

According to another aspect of the present invention, a rod holder is adapted to receive a handle of a fishing rod therein and removably mount to a support structure. The rod holder includes a cylindrical rod holding portion and a clamping device. The rod holding portion is adapted to receive the handle of the fishing rod. The clamping device includes a pair of clamping arms pivotably secured together about a pivot axis and having a clamping portion and a handle portion at opposite ends thereof. The rod holding portion is mounted to the handle portion of one the clamping arms. Preferably, the rod holding portion is pivotally or rotatably mounted to the clamping arm and is rotatable relative thereto in order to adjust an orientation of the rod holding portion with respect to horizontal and to the clamping device.

According to another aspect of the present invention, a fishing pole holder and signaling device for holding the fishing pole and signaling when a fish strikes comprises a cylindrical rod holding portion, a clamping device, a flexible member, a signaling member and a release mechanism. The fishing pole includes a handle, a rod and a reel or spool which pays out and retracts line. The cylindrical rod holding portion is adapted to receive the handle of the fishing pole therein and includes a connecting member. The clamping device is attached to the rod holding portion and adapted to clamp to a fixed structure to retain the fishing pole in an operative position. The flexible member includes a first and second end, whereby the first end is mounted to the rod holding portion. The signaling member is mounted on the flexible member. The release mechanism is rotatably mounted on the flexible member and is engagable with the connecting member to retain the flexible member in a set position. The release mechanism is adapted to receive the fishing line whereby the release mechanism is rotatable relative to the flexible member to release from the connecting member in response to tension in the fishing line. The flexible member is movable to a signaling position when the release mechanism releases from the connecting member. Preferably, the signaling member is movably mounted to flexible member, such that the signaling member is movable toward the second end of the flexible member as the flexible member moves to the signaling position. Preferably, the signaling member is frictionally retained at the second end of the flexible member when the flexible member is in the signaling position.

In one form, the cylindrical rod holding portion is pivotally mounted to the clamping device and is pivotable to pivot the fishing pole between the generally horizontal position, which is an operative position for ice fishing and a generally vertical position, which is an operative position for other fishing applications. Preferably, the generally horizontal position is at an angle of less than approximately 30 degrees above horizontal and the generally vertical position is at an angle of greater than approximately 45 degrees above horizontal. The rod holding portion may include a notch for receiving a mounting portion of the fishing reel therein in order to limit rotation of the fishing pole within the rod holding portion when the fishing pole is received therein.

Therefore, the present invention provides a fishing pole holder and signaling device which provides a visible and/or audible signal to a user thereof in response to tension in the fishing line. The fishing rod holder is compact and easily portable and is adapted to clamp onto various structures, such that the present invention may be implemented in various environments. Additionally, the holder is adaptable to various fishing applications.

These and other objects, advantages, purposes and features of this invention will become apparent upon review of the following specification in conjunction with the drawings.

BRIEF DESCRIPTION OF THE DRAWINGS

FIG. 2 is a top plan view of a signaling device and flexible member useful with the present invention;

FIG. 3 is an end elevation of the signaling device of FIG. 2;

FIG. 4A is a side elevation of a portion of the rod holder of the present invention;

FIG. 4B is an end elevation of the rod holder of FIG. 4A;

FIG. 4C is a lower plan view of the rod holder of FIG. 4A;

FIG. 7 is an enlarged side elevation of the rod holder and signaling device of the present invention with the signaling device in a set position;

FIG. 8 is an end elevation of the signaling device of FIG. 7; and

FIG. 9 is an enlarged view similar to FIG. 7, with the signaling device in a signaling position.

DESCRIPTION OF THE PREFERRED EMBODIMENTS

Figure 1:
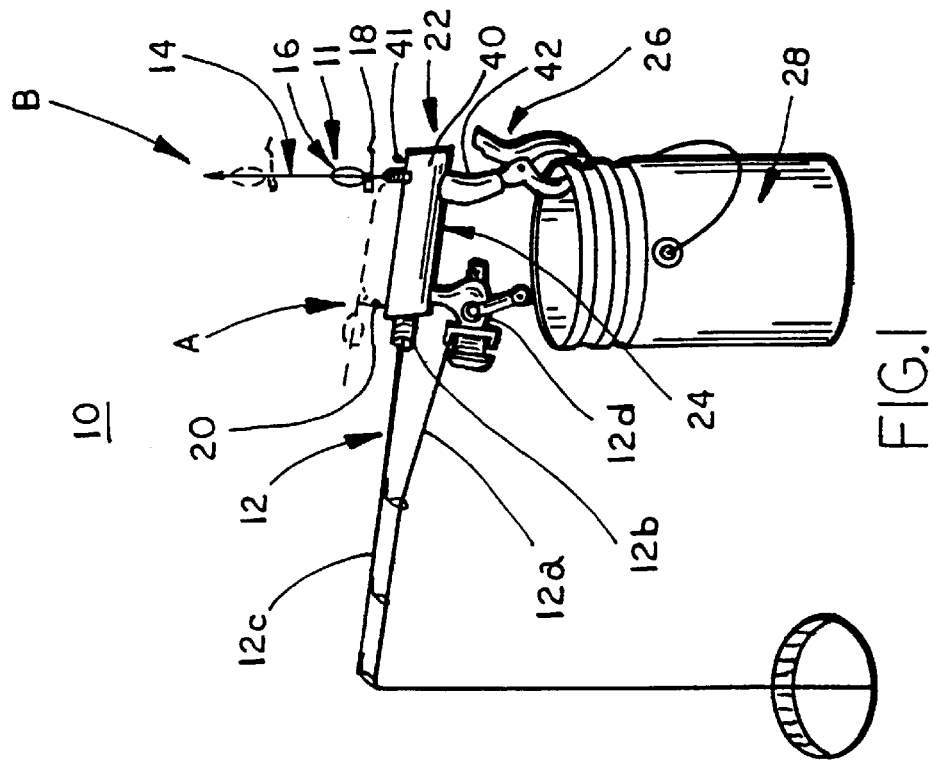
FIG. 1 is a perspective view of a rod holder and signaling device in accordance with the present invention with a fishing pole secured therein.

Referring now specifically to the drawings and the illustrative embodiments depicted therein, a fishing rod holder and signaling device 10 is adapted to hold a fishing pole 12 and to provide a signal in response to tension detected in the fishing line 12a of fishing pole 12 (FIG. 1). Fishing rod holder and signaling device 10 includes a rod holder 22 and a signaling device 11, which further includes a flexible member 14, a signaling element or member 16, which is movably mounted on flexible member 14, and a release mechanism 18 rotatably mounted on the flexible member 14 (FIGS. 1 and 6–9). Release mechanism 18 is adapted to engage a connecting member or connector 20, such as a hook or eye positioned along the rod or rod holder, to retain flexible member 14 and signaling element 16 in a set position A (FIG. 1). Release mechanism 18 is further adapted to receive the fishing line 12a, whereby release mechanism 18 is rotatable relative to flexible member 14 to release from connector 20 in response to tension in fishing line 12a. Flexible member 14 is then movable to a signaling position B when release mechanism 18 releases from connector 20. Preferably, signaling element 16 is movable along a flexible member 14 and toward an upper end thereof as flexible member 14 moves to the signaling position B. Rod holder 22 includes a rod holding portion 24 and a clamping member or device 26. Rod holding portion 24 receives a handle 12b of fishing pole 12 therein, while clamping device 26 may clamp or otherwise secure rod holder 22 to a support structure, such as a conventional bucket or pail 28. Fishing pole 12 may be a conventional fishing pole and includes a rod 12c with a handle 12b, a fishing reel 12d, such as a spinning reel, casting reel or the like, which is mounted to handle 12b, and is operable to release or pay out and retract fishing line 12a, as is known in the art.

As best shown in FIGS. 2 and 3, flexible member 14 is preferably an elongated shaft 14d or the like and may comprise metal or polymeric materials. A mounting end 14a of flexible member 14 includes a biasing member or spring 15 which is mounted to rod holding portion 24 and flexes to allow flexible member 14 to pivot or flex between the set position A and the signaling position B. An outer end 14b of flexible member 14 includes a stop 14c, such as a crimped or raised portion, which functions to limit longitudinal movement of signaling element 16 along flexible member 14 as flexible member 14 moves toward the signaling position, as discussed below.

Signaling element 16 includes a cylindrical opening or passageway 16a therethrough to slidably receive shaft 14d of flexible member 14. Cylindrical passageway 16a is sized to tightly receive shaft 14d therethrough, such that signaling element 16 is slidable along shaft 14d, yet frictionally retained in any given position therealong. Preferably, signaling element 16 is formed of a highly visible or bright material and/or colored to provide a highly visible signal to the user of rod holder and signaling device 10. Optionally, signaling element 16 may be an audible signaling device which provides an audible signal to the angler in response to tension in fishing line 12a. The audible signaling element preferably comprises a housing 16b and a plurality of items 16c, such as balls, bearings or the like, positioned within housing 16b (FIGS. 2, 3 and 6–8). Accordingly, as signaling element 16 is moved along flexible member 14, items 16c move within housing 16b and impact housing 16b to generate an audible signal or rattle to alert the user of rod holder and signaling apparatus 10 that a fish has struck their bait or hook.

Release mechanism 18 is also slidably positioned along shaft 14d of flexible member 14 and preferably connected to signaling element 16, such that release member 18 moves along shaft 14d of flexible member 14 with signaling element 16. Preferably, release member 18 includes a coil spring 34, with a hook or retainer 36 at one end of spring 34 and a line receiving arm 38 at the other end. Spring 34 is coiled about shaft 14d and preferably has a generally cylindrical passageway therethrough which is sized to loosely fit over shaft 14d, in order to allow unrestricted rotation of release mechanism 18 relative to shaft 14d of flexible member 14. Hook arm 36 extends radially outwardly from spring 34 and thus from shaft 14d of flexible member 14. Hook arm 36 includes a curved or hooked end 36a at an end opposite of spring 34 for engaging with connector 20 on rod holder 22, as discussed below.

Line receiving arm 38 of release mechanism 18 extends radially outwardly from spring 34 and preferably extends outwardly approximately 90 degrees from hook arm 36, as best shown in FIGS. 3 and 8. Line receiving arm 38 preferably includes at least one line cradle or curved section 38a for receiving the fishing line 12a therein. Preferably, line receiving arm 38 includes an outer line cradle 38a and an inner line cradle 38b, such that rotation of release mechanism 18 may be accomplished in response to varying degrees of tension in fishing line 12a, as discussed below.

As shown in FIGS. 4A–4C, rod holding portion 24 of rod holder 22 includes a generally cylindrical or tubular portion 40 and a mounting portion or arm 42. Cylindrical portion 40 defines a generally cylindrical passageway 40a therethrough for receiving handle 12b of fishing rod. Preferably, a threaded opening 40b is provided along cylindrical portion 40 for receiving a set screw 41 (FIGS. 1, 6, 7 and 9) to retain and adjust the position of rod handle 12b relative to cylindrical portion 40. Cylindrical portion 40 is preferably formed with a second opening 40c at a forward end 40d to receive connector 20 therein. Additionally, cylindrical portion 40 includes a mounting portion 40e at a rearward end 40f of cylindrical portion 40 for mounting and retaining flexible member 14 thereon, such as via spring 15. Preferably, mounting portion 40e is a raised cylindrical portion which is received within spring 15 of flexible member 14, such that spring 15 may be threaded onto mounted portion 40e to retain flexible member 14 to rod holding portion 24. Cylindrical portion 40 further includes a cut away slot 40g (FIG. 4C) at forward end 40d and along a lower portion thereof. Slot 40g functions to receive a mounting portion 12e of fishing reel 12d therein, such that fishing pole 12 cannot pivot or rotate within cylindrical portion 40 once fishing pole 12 has fully been inserted in therein.

Mounting portion or arm 42 extends downwardly from rearward end 40f of cylindrical portion 40 and is preferably angled or bent with respect to cylindrical portion 40, such that rod holder 22 mounts and holds fishing pole 12 in an operable position when clamped to support structure 28. Preferably, the angle of mounting arm 42 is selected to be approximately 45 degrees. Arm 42 is preferably a substantially straight tubular section which is mounted at an angle relative to cylindrical portion 40 (FIGS. 4A–C). However, arm 42 may be bent or curved, as shown in FIGS. 1, 6, 7 and 9, or otherwise formed to provide a desired angle between a lower mounting end 42c and cylindrical portion 40 of rod holder 22. Lower end 42c of mounting arm 42 preferably has a narrower diameter than an upper portion 42b of arm 42 and is pivotally attached to clamping device 26. One or more holes 42a may be formed in lower end 42c of mounting arm 42 of rod holder 24 to facilitate locking mounting arm 42 in a desired orientation relative to clamping device 26 via a pin or set screw (not shown) or the like. Preferably, rod holding portion 24 is molded of a substantially rigid polymer or plastic material and may be of unitary or one piece construction. Alternately, however, rod holding portion 24 may be formed of any plastic or metal tubing, without affecting the scope of the present invention.

Figure 5A:
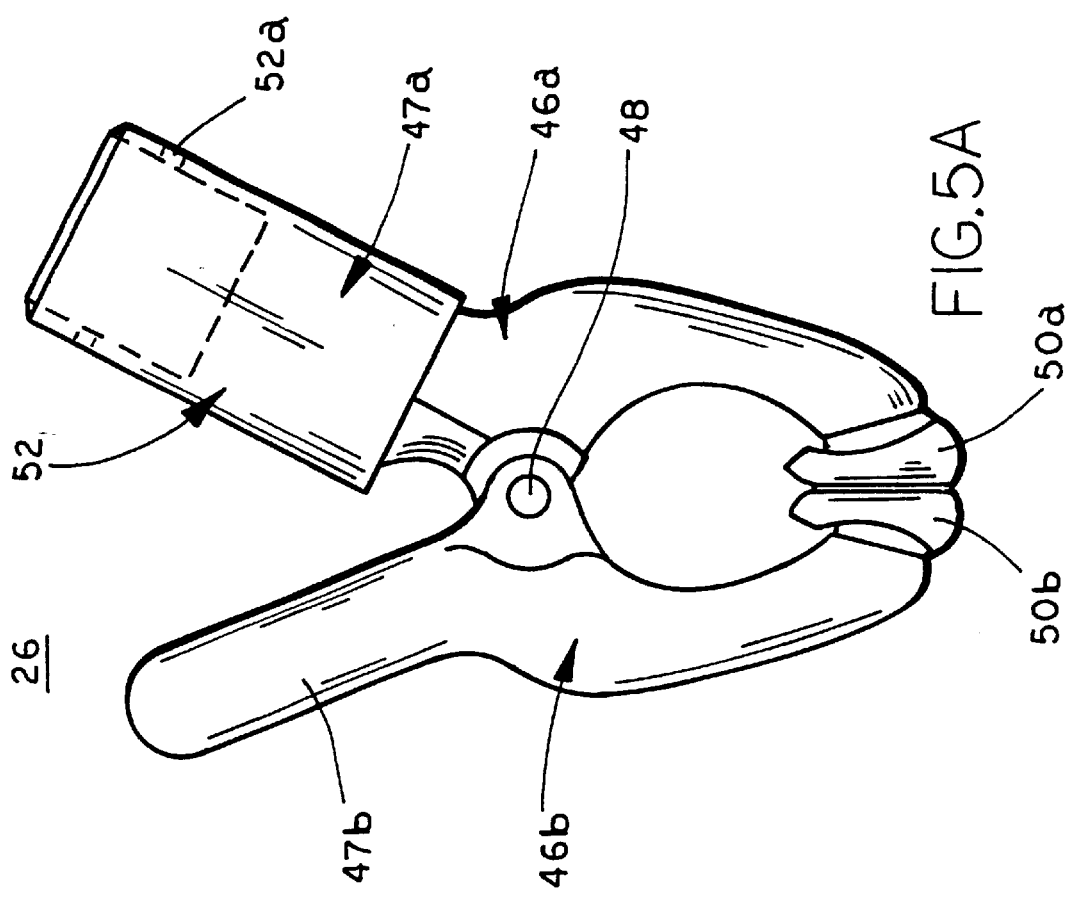
FIG. 5A is a side elevation of a clamping device of the rod holder of the present invention.
Figure 5B:
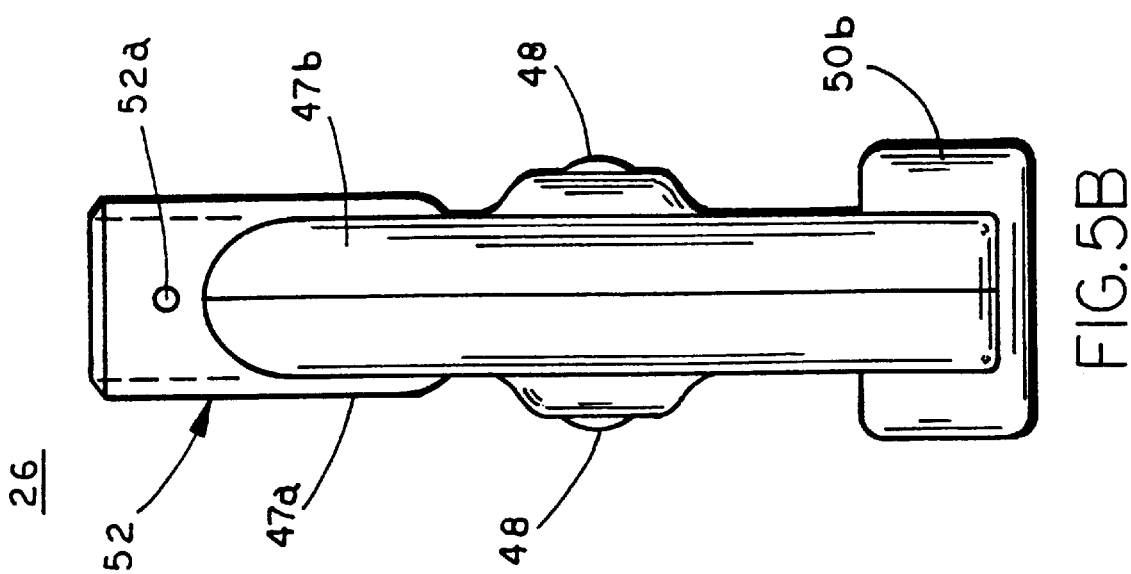
FIG. 5B is an end elevation of the clamping device of FIG. 5A.

As best shown in FIGS. 5A and 5B, clamping device 26 includes a pair of hinged clamping members 46a and 46b, which are pivotally connected to one another at a hinge or pivot 48 to allow opening and closing of a pair of corresponding clamping portions or engaging surfaces 50a and 50b, respectively. Clamping members 46a and 46b may be substantially similar to conventional hand operated clamps, whereby the clamping portions 50a, 50b are biased in a closed position and may be opened by a user grasping the handle ends 47a, 47b of the clamping members 46a, 46b and squeezing them together to separate the jaws or clamping portions 50a and 50b. The clamping portions 50a, 50b may then be placed over a targeted structure, whereby the handle ends 47a, 47b may be released to clamp clamping device 26 to the structure. Preferably, clamping device 26 is operable to provide the angler with an attachment device which is capable of attaching to any solid structure which is less than the opening gap of the jaws, such as less than 1½ to 2 inches thick, such as any common 5 gallon bucket or pail 28.

One of the clamping members or arms 46a includes a mounting portion 52 extending therefrom. Mounting portion 52 is preferably cylindrical and has a hollowed end which is sized to receive lower end 42c of mounting arm 42 of rod holding portion 24, and preferably pivotably receive lower end 42c, therein. An opening 52a is provided at least partially through mounting portion 52 for securing rod holding portion 24 to clamping device 26. Preferably, clamping arm 46a is angled or curved such that cylindrical mounting portion 52 is offset from a vertical orientation when clamping device 26 is clamped to a generally vertical support structure. This facilitates adjustment of the angle of cylindrical portion 40 via rotation of mounting arm 42 relative to mounting portion 52, as discussed below. In the illustrated embodiment, cylindrical mounting portion 52 is offset or angled approximately 25 degrees from vertical when clamping device 26 is in a generally vertical orientation.

When assembled, rod holding portion 24 is pivotable about cylindrical mount 52 of clamping portion 26 and may be secured in a preferred operative orientation via an insertion of a pin, screw or the like (not shown) through openings 42a in mounting arm 42 and corresponding opening 52a through cylindrical mount 52 of clamping device 26. Preferably, mounting arm 42 receives cylindrical mount 52 in a substantially snug or tight fashion, whereby relative rotation between the parts is partially resisted via frictional engagement of the parts.

Figure 6:
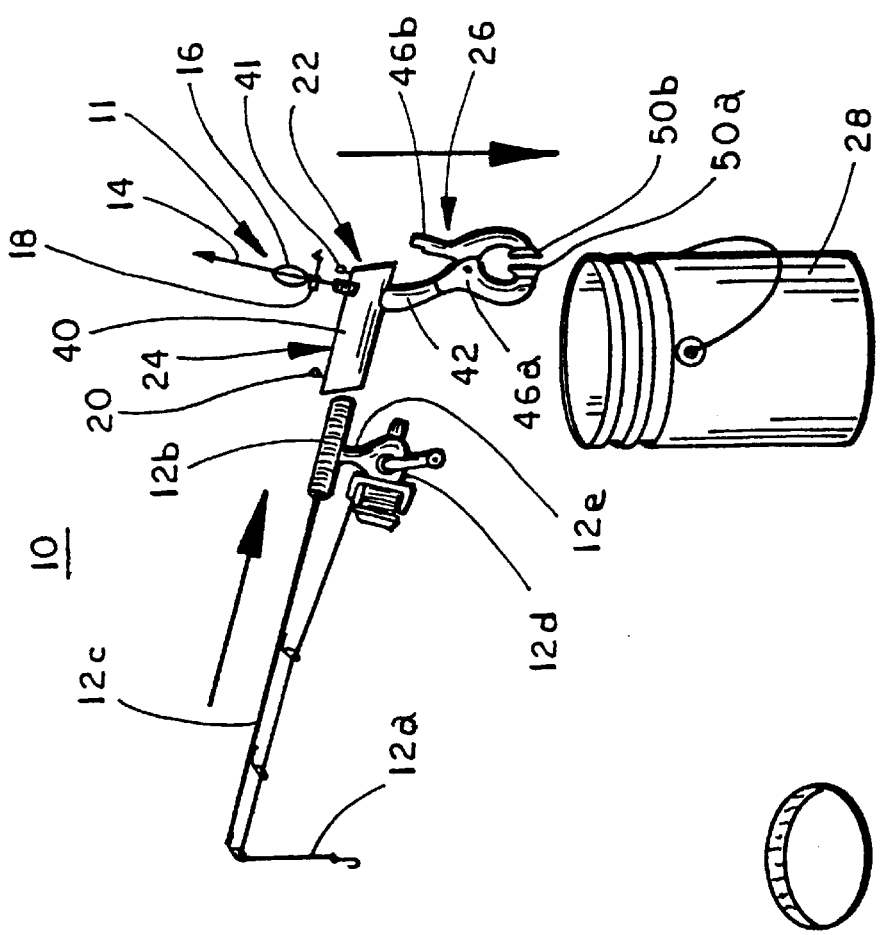
FIG. 6 is a perspective view similar to FIG. 1, with the fishing pole removed and the clamping device disengaged from the support structure.

As best shown in FIG. 6, when an angler wishes to set up their fishing rod for ice fishing or other non-interactive fishing, handle 12b of fishing pole 12 is inserted into rod holder 24 and retained therein via tightening of set screw 41. Clamping members 46a, 46b are pivoted relative to one another to open clamping portions 50a, 50b to secure rod holder 22 to an appropriate structure 28. Once rod holder and signaling device 10 is secured to the fixed structure 28, rod holding portion 24 and mounting arm 52 may be rotated relative to clamping device 26, in order to position rod holding portion 24 in a desired orientation, such as generally horizontal for ice fishing. Flexible member 14 of signaling device 11 may be bent forwardly along rod holder 24 toward the set position A (FIGS. 1 and 7). Release mechanism 18 is then rotated in a set direction C, such as in a generally counter clockwise direction with respect to FIG. 8, to engage hook portion 36a of arm 36 with screw eye or connector 20 at forward end 40d of rod holder 24. When hook portion 36a is engaged with eye 20, flexible member 14 is retained in the generally horizontal, set position A along rod holding portion 24, while line receiving arm 38 extends generally sidewardly with respect to flexible member 14 and rod holder 22. After fishing line 12a has been released or paid out from fishing reel 12d to place the bait or hook at an appropriate depth, fishing line 12a is draped or hooked over one of the line cradles 38a or 38b of line receiving arm 38 of release mechanism 18. The reel 12d may then be closed or locked to prevent or at least restrict further pay out of line 12a. The fishing pole may then be left by the angler, who may desire to monitor, either visually or audibly, the signaling device from a remote location.

When an appropriate amount of tension is created in line 12a, such as due to a fish pulling or striking the bait or hook, line 12a will create a downward force on line receiving arm 38, which causes rotation of the release mechanism 18 in a release direction D, which is opposite the set direction C (FIG. 8), to disengage hook 36a from connector 20. Once arm 36 is disengaged from connector 20, spring 15 causes flexible member 14 to rapidly return to its initial upright or signaling position B. As flexible member 14 swings upwardly, signaling element 16 and release mechanism 18 slide upwardly and longitudinally outwardly along shaft 14a until further movement is limited by stop 14c at upper end 14b of flexible member 14. Flexible member 14 will continue to oscillate back and forth about its upright position, which will cause items 16c to rattle within body 16b of signaling element 16, thereby providing an audible signal that the signaling device has been triggered. Preferably, signaling element 16 is additionally, or alternatively, brightly colored to provide a highly visible signal as well to the angler.

Because line cradles 38a, 38b are positioned at different distances radially outwardly from spring 34 and shaft 14d, they create moment arms of different magnitudes in response to a similar amount of tension in fishing line 12a. Accordingly, a lower amount of tension in fishing line 12a may cause release mechanism 18 to release from connector 20 when fishing line 12a is draped over outer line cradle 38a, while a greater amount of tension is required to trigger release mechanism 18 when the line 12a is draped over or engaged with the inner line cradle 38b of release mechanism 18. This provides the angler with a variable threshold of tension required to trigger signaling device 11, depending on the fishing conditions or type of fish the angler is pursuing.

After signaling device 11 has been triggered, signaling element 16 is frictionally retained at upper end 14b of shaft 14d to maximize the height of the signal for easier visibility by the angler. In order to reset signaling device 11, signaling member 16 and release mechanism 18 are slid back down the shaft 14 to an appropriate location for connecting hook arm 36 to connector 20 when flexible member 14 is bent or positioned downwardly and forwardly along rod holder 24. A second stop or crimp (not shown) may be provided along shaft 14d to positively locate release mechanism 18 at an appropriate position along shaft 14d of flexible member 14 for subsequent connection of hook arm 36 to connector 20.

Although shown and described as holding the fishing pole in a generally horizontal orientation for ice fishing, rod holder and signaling device 10 is equally applicable to other non-interactive types of fishing. For example, the fishing line may be cast, trolled or otherwise extended away from the location of the rod and reel, such that the line may be pulled by a fish in a direction generally laterally or horizontally relative to the fishing pole, or in other words, the line is not pulled in a primarily vertical or downward direction as is typically the case with ice fishing. Because the line is likely to be pulled by a fish generally horizontally from the fishing pole, it is desirable to have the rod positioned generally vertically to flex as the line is pulled.

Accordingly, rod holding portion 24 of rod holder 22 may be rotated relative to clamping device 26 to adjust the rod to a generally vertical position, in order to adapt the holder to other types of fishing methods. The angles of clamping member 46a, mounting arm 42 and rod holding portion 40 cooperate to provide the generally horizontal orientation for ice fishing, which is preferably less than approximately 30 degrees above horizontal, while further allowing rod holding portion 24 to be pivoted relative to clamping device 26 toward a more vertical position with respect to clamping device 26 and support 28, when clamping device 26 is clamped to a generally vertical support structure. Preferably, the vertical orientation of cylindrical portion 40 is greater than approximately 45 degrees above horizontal when clamping device 26 is mounted to the generally vertical support structure. In the illustrated embodiment, the rod holding portion is adjustable between an angle approximately 20 degrees above horizontal and an angle approximately 65 degrees above horizontal, when the clamping device is clamped to a generally vertical support structure. Although shown as clamping to a generally vertical support, clearly clamping device 26 is adapted to clamp to other supports, such as horizontal or angled support structures, such that cylindrical portion 40 is adjustable to other angles, without affecting the scope of the present invention.

Therefore, the present invention provides a fishing rod holder and a signaling device for holding a conventional rod and reel stationary for ice fishing or other non-interactive or remotely monitored fishing applications and for providing a visible and/or audible signal to an angler in response to a sufficient amount of tension being detected in the fishing line. The fishing rod holder of the present invention is highly compact relative to rod holders of the prior art and thus may be easily transported from one location to the next and easily mounted or secured to almost any fixed structure. The signaling device is easy to set up by the angler and provides a visible and/or audible signal to the angler when tension in the line is sufficient to trigger the release mechanism of the signaling device.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A fishing rod holder for removably mounting a fishing rod to a support structure, comprising:
   a cylindrical rod holding portion adapted to receive a handle of the fishing rod therein;
   a mounting arm extending outwardly from said rod holding portion at an oblique angle with respect to said rod holding portion; and
   a clamping device comprising first and second clamping arms pivotally secured together at a pivot axis and each of said arms having a clamping portion and a handle portion, said pivot axis being positioned between said handle portions and said clamping portions of said first and second clamping arms, said handle portion of said first clamping arm defining a longitudinal axis extending along said handle portion, said mounting arm being rotatably mounted to said handle portion of said first clamping arm and being rotatable about said longitudinal axis, such that rotation of said mounting arm relative to said handle portion of said first clamping arm about said longitudinal axis adjusts a vertical and horizontal orientation of said rod holding portion with respect to said clamping device.

2. The rod holder of claim 1, wherein said longitudinal axis is offset from vertical when said clamping device is clamped to a generally vertical support.

3. The rod holder of claim 2, wherein said mounting arm is rotatable about said longitudinal axis between a first position, where said rod holding portion is at an angle less than approximately 30 degrees above horizontal, and a second position, where said rod holding portion is at an angle greater than approximately 45 degrees above horizontal, when said clamping device is clamped to the generally vertical support.

4. The rod holder of claim 1, wherein said rod holding portion includes a notch for receiving a mounting portion of a fishing reel of the fishing rod to limit rotation of the fishing rod within said rod holding portion about a longitudinal axis thereof.

5. The rod holder of claim 1 further including a signaling device which is operable to generate a signal in response to tension being detected in a fishing line of the fishing rod.

6. The rod holder of claim 5, wherein said signaling device comprises:
- a flexible member mounted to said rod holding portion;
- a connecting member mounted to said rod holding portion;
- a signaling member movably mounted on said flexible member; and
- a release mechanism rotatably mounted on said flexible member, said release mechanism being engagable with said connecting member to retain said flexible member in a set position, said release member being adapted to receive fishing line, whereby said release mechanism is rotatable relative to said flexible member to release from said connecting member in response to tension in the fishing line, said flexible member being movable to a signaling position when said release mechanism releases from said connecting member.

7. A signaling device for a fishing pole having a rod and fishing line, said signaling device comprising:
- a rod holding portion adapted to hold a rod or handle portion of a fishing pole said rod holding portion including a connector;
- a flexible member having first and second ends, said first end of the flexible member being mounted to said rod holding portion;
- a signaling member movably mounted on said flexible member and slidable along said flexible member; and
- a release mechanism rotatably mounted on said flexible member and which engages said connector along said rod holding portion when retaining said flexible member in a set position, said release mechanism being adapted to receive the fishing line, whereby said release mechanism is rotatable about an axis defined along said flexible member and generally parallel to a longitudinal axis of said rod holding portion when said flexible member is in said set position, wherein said release mechanism rotates relative to said flexible member to release from said connector in response to tension in the fishing line when the fishing line is received by the release mechanism, said flexible member moves to a signaling position when said release mechanism releases from said connector, and said signaling member moves along said flexible member toward said second end of said flexible member in response to said flexible member moving toward the signaling position.

8. The signaling device of claim 7, wherein said release mechanism includes a first arm and a second arm extending radially outwardly from said flexible member, said first arm being adapted to engage said connector to retain said flexible member in the set position and said second arm being adapted to receive the fishing line.

9. The signaling device of claim 8, wherein said second arm includes at least two fishing line receiving portions spaced radially outwardly from said flexible member.

10. The signaling device of claim 1, wherein said signaling member comprises an audible signaling member which provides an audible signal when said flexible member moves to the signaling position.

11. The signaling device of claim 10, wherein said signaling member includes a housing and a plurality of items loosely positioned within said housing, whereby said items impact said housing as said flexible member is moved to provide the audible signal.

12. The signaling device of claim 1, wherein said signaling member is frictionally retained at said second end of said flexible member when said flexible member is in the signaling position.

13. A fishing pole holder and signaling device for holding a fishing pole and signaling when a fish strikes, the fishing pole having a handle, a rod and a reel which pays out and retracts fishing line, said holder and signaling device comprising:
- a rod holding portion which is adapted to receive the handle of the fishing pole therein, said rod holding portion including a connecting member;
- a clamping device attached to said rod holding portion, said clamping device being adapted to clamp to a fixed structure to retain the fishing pole in an operative position, said rod holding portion being attached to said clamping device;
- a flexible member having a first end and a second end, said first end of said flexible member being mounted to said rod holding portion;
- a signaling member slidably mounted on said flexible member and slidable along said flexible member; and
- a release mechanism rotatably mounted on said flexible member, said release mechanism engages with said connecting member when retains said flexible member in a set position, said release mechanism being rotatable about a pivot axis generally parallel to a longitudinal axis of said rod holding portion when said flexible member is in said set position, said release mechanism receives the fishing line when in said set position, whereby when in said set position, said release mechanism rotates about said pivot axis relative to said flexible member to release from said connecting member in response to tension in the fishing line, said flexible member moves to a signaling position when said release mechanism releases from said connecting member, said signaling member sliding along said flexible member toward said second end of said flexible member as said flexible member moves to said signaling position.

14. The fishing pole holder and signaling device of claim 13, wherein said rod holding portion includes a rod receiving portion for receiving the handle and a mounting arm extending outwardly from said rod receiving portion, said mounting arm extending at an oblique angle with respect to said rod receiving portion, said mounting arm being rotatably mounted to a mounting portion of said clamping device such that rotation of said mounting arm about an axis defined by said mounting portion causes adjustment of a vertical orientation of said rod receiving portion of said rod holding portion relative to said clamping device.

15. The fishing pole holder and signaling device of claim 13, wherein said release mechanism includes a first arm and a second arm extending radially outwardly from said flexible member, said first arm being engagable with said connecting member and said second arm being adapted to receive the fishing line when said flexible member is in said set position.

16. The fishing pole holder and signaling device of claim 15, wherein said second arm includes at least two line receiving portions spaced radially outwardly from said flexible member.

17. The fishing pole holder and signaling device of claim 13, wherein said signaling member comprises an audible signaling member which provides an audible signal when said flexible member moves to the signaling position.

18. The fishing pole holder and signaling device of claim 17, wherein said signaling member includes a housing and a plurality of items loosely positioned within said housing, whereby said items impact said housing as said flexible member is moved to provide the audible signal.

19. The fishing pole holder and signaling device of claim 13, wherein said signaling member is frictionally retained at said second end of said flexible member when said flexible member is in the signaling position.

20. The fishing pole holder and signaling device of claim 13, wherein said rod holding portion is pivotally mounted to said clamping device and is pivotable relative thereto about a single pivot axis in order to adjust a vertical and horizontal orientation of said rod holding portion with respect to said clamping device.

21. The fishing pole holder and signaling device of claim 20, wherein said rod holding portion is pivotable relative to said clamping device to pivot the fishing pole between a first position, where said rod holding portion is at an angle less than approximately 30 degrees above horizontal, and a second position, where said rod holding portion is at an angle greater than approximately 45 degrees above horizontal, when said clamping device is clamped to a generally vertical support.

22. The fishing pole holder and signaling device of claim 20, wherein said rod holding portion includes a rod receiving portion for receiving the handle of the fishing pole and a first mounting portion extending at an oblique angle from said rod receiving portion, said clamping device including a second mounting portion extending therefrom, said first and second mounting portions defining said single pivot axis, said first mounting portion being rotatable about said single pivot axis relative to said second mounting portion to adjust the vertical and horizontal orientation of said rod receiving portion relative to said clamping device.

* * * * *